United States Patent
Feustel et al.

(10) Patent No.: US 12,445,073 B2
(45) Date of Patent: Oct. 14, 2025

(54) METHOD FOR CONTROLLING A MULTIPHASE VOLTAGE SIGNAL IN A CLOSED-LOOP MANNER, OPEN-LOOP CONTROL DEVICE, DRIVE SYSTEM AND MOTOR VEHICLE

(71) Applicant: Bayerische Motoren Werke Aktiengesellschaft, Munich (DE)

(72) Inventors: Silko Feustel, Munich (DE); Daniel Glose, Munich (DE); Jovan Knezevic, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 143 days.

(21) Appl. No.: 18/558,557

(22) PCT Filed: Jun. 8, 2022

(86) PCT No.: PCT/EP2022/065480
§ 371 (c)(1),
(2) Date: Nov. 2, 2023

(87) PCT Pub. No.: WO2023/274670
PCT Pub. Date: Jan. 5, 2023

(65) Prior Publication Data
US 2024/0146224 A1    May 2, 2024

(30) Foreign Application Priority Data
Jul. 2, 2021    (DE) .................. 10 2021 117 103.2

(51) Int. Cl.
*H02P 21/05*    (2006.01)
*H02P 21/22*    (2016.01)
*H02P 25/22*    (2006.01)

(52) U.S. Cl.
CPC .............. *H02P 21/22* (2016.02); *H02P 25/22* (2013.01)

(58) Field of Classification Search
CPC .......... H02P 21/22; H02P 25/22; H02P 29/50; H02P 21/00
See application file for complete search history.

(56) References Cited

U.S. PATENT DOCUMENTS

| | | | |
|---|---|---|---|
| 2011/0224957 A1 | 9/2011 | Ransom et al. | |
| 2017/0361732 A1* | 12/2017 | Grubic | ..................... H02P 21/22 |
| 2021/0399664 A1* | 12/2021 | Zhao | ....................... H02P 21/30 |

FOREIGN PATENT DOCUMENTS

| | | |
|---|---|---|
| CN | 103715973 A | 4/2014 |
| DE | 10 2011 003 866 A1 | 3/2012 |

OTHER PUBLICATIONS

International Search Report (PCT/ISA/210) issued in PCT Application No. PCT/EP2022/065480 dated Oct. 10, 2022 with English translation (5 pages).

(Continued)

*Primary Examiner* — Muhammad S Islam
(74) *Attorney, Agent, or Firm* — Crowell & Moring LLP

(57) ABSTRACT

A method for controlling a multiphase voltage signal in a closed-loop manner is provided. The multiphase voltage signal is supplied to at least one phase set of a stator of an electric machine of a drive system of a motor vehicle for the purpose of generating a torque-specific, rotary magnetic field. The method includes determining a fundamental space vector representing a fundamental of the voltage signal, determining at least one harmonic space vector representing a harmonic of the voltage signal, adding the fundamental space vector and the at least one harmonic space vector to form a summed space vector, determining whether the summed space vector exceeds a predetermined threshold (Continued)

value, and limiting the summed space vector in such a manner that the limited summed space vector falls short of the threshold value.

14 Claims, 3 Drawing Sheets

(56) References Cited

OTHER PUBLICATIONS

German-language Written Opinion (PCT/ISA/237) issued in PCT Application No. PCT/EP2022/065480 dated Oct. 10, 2022 with English translation (9 pages).
German Search Report issued in German Application No. 10 2021 117 103.2 dated May 10, 2023 with partial English translation (12 pages).
J. Karttunen et al.; "Partial Current Harmonic Compensation in Dual Three-Phase PMSMs Considering the Limited Available Voltage", IEEE Transactions on Industrial Electronics, IEEE Service Center Piscataway, NJ, USA, Feb. 1, 2017, pp. 1038-1048, vol. 64, No. 2, XP 011638728 (11 pages).

\* cited by examiner

METHOD FOR CONTROLLING A MULTIPHASE VOLTAGE SIGNAL IN A CLOSED-LOOP MANNER, OPEN-LOOP CONTROL DEVICE, DRIVE SYSTEM AND MOTOR VEHICLE

BACKGROUND AND SUMMARY

The invention relates to a method for controlling a multiphase voltage signal which is supplied to at least one phase set of a stator of an electrical machine of a drive system of a motor vehicle, for the purpose of generating a torque-specific rotary magnetic field. The invention further relates to a control device, a drive system, and a motor vehicle.

The focus of interest in the present document relates to drive systems for electrically powered vehicles, which comprise at least one electrical machine. The electrical machine is designed to deliver a specific torque, or drive torque, for the motor, and comprises a stator, and a rotor which is rotatably mounted vis-à-vis the stator. The stator customarily comprises at least one phase set having at least three (stator) phases. A multiphase current is supplied to the at least one phase set for generating a torque-specific rotary magnetic field in the stator. To this end, each phase is electrically connected to a half-bridge of an inverter of the drive system, via which a phase current of the multiphase current signal is injected into each phase, wherein phase voltages of a multiphase voltage signal output from the inverter are applied to the phase windings.

A sinusoidal fundamental phase current wave, for example, can be encumbered by a harmonic wave, which is a source of losses, such that the maximum power which can be generated by the electrical machine is adversely affected. Moreover, the inverter assumes a specific operating range, which is expanded by a tolerance margin for the accommodation of peak values in phase currents. In the event of peak currents which lie outside the tolerance margin, the inverter is customarily switched off. In particular, peak currents can exceed the tolerance margin of the inverter, if an amplitude of the fundamental wave is increased by an amplitude of the harmonic wave.

In order to prevent this, for example, torque can be reduced to the extent that compliance with the tolerance limit of the inverter is achieved. To this end, the controllable voltage signal output of the invention can be continuously limited. In many cases, this limitation is executed to an unnecessarily high level such that, in turn, current harmonics are generated, thereby resulting in additional losses.

The object of the present invention is the provision of a solution, by means of which an electrical machine of a drive system of a motor vehicle can be operated in a simple and low-loss manner.

According to the invention, this object is fulfilled by a method, a control device, a drive system and a motor vehicle having the features claimed in the respective independent patent claims. Advantageous embodiments of the invention are the subject matter of the dependent patent claims, the description and the figures.

A method according to the invention is employed for controlling a multiphase voltage signal which is supplied to at least one phase set of a stator of an electrical machine of a drive system of a motor vehicle, for the purpose of generating a torque-specific rotary magnetic field. A fundamental space vector, representing a fundamental wave of the voltage signal, and at least one harmonic space vector, representing a harmonic wave of the voltage signal, are defined. This fundamental space vector and the at least one harmonic space vector are added to form a summed space vector, and a check is executed as to whether the summed space vector exceeds a predefined threshold value. In the event that the summed space vector exceeds the predefined threshold value, the summed space vector is limited such that it falls below the threshold value.

The invention further relates to a control device for a drive system of a motor vehicle, which is designed to execute a method according to the invention. The invention moreover includes a drive system for a motor vehicle, which comprises at least one electrical machine. The at least one electrical machine comprises a stator, and a rotor which is rotatably mounted vis-à-vis the stator, wherein the stator comprises at least one phase set having three phases. The drive system moreover comprises at least one inverter for supplying the multiphase voltage signal to the phases of the at least one phase set, and a control device according to the invention.

The electrical machine, in particular, is configured in the form of a rotary field machine, and can be, for example, a permanently excited rotary field machine (PSM) or a current excited rotary field machine (SSM). The electrical machine, for example, can be a three-phase machine, and thus comprises a phase set having three (stator) phases. Preferably, the at least one electrical machine is a six-phase electrical machine, and comprises at least two phase sets, each having three phases, wherein the phases of a phase set are mutually offset through an angle of 120° about an axis of rotation of the rotor, and wherein the at least two phase sets are mutually offset through an angle of 30°. Each of the phase sets is configured in a star-connected arrangement, with a potential-free neutral point, and the neutral points of the different phase sets are galvanically isolated from one another.

The at least one phase set is electrically connected to an inverter or power inverter of the drive system, which converts a DC voltage supplied by an electrical energy store of the drive system into a multiphase voltage signal. This multiphase voltage signal is applied to the windings of the phase set, and generates a three-phase current therein, by means of which, in turn, a rotary magnetic field is generated in the stator.

At least one of the phase currents can assume a peak current value which lies outside an operating range of the inverter. In this case, or in the event that the peak current also lies outside a tolerance margin of the inverter, by which the operating range of the inverter is extended, this will result in an increased loading of inverter components, and a consequent reduction in service life. If the peak current lies within a switch-off range of the inverter, it is possible that the inverter will be switched off in an unwanted manner.

In order to prevent this, a control strategy for the multiphase voltage signal is provided, wherein output voltages of the at least one inverter are limited, not continuously, but only if necessary. To this end, the multiphase voltage signal, which is customarily formed of at least three output voltages of the inverter, is represented as a space vector in a two-dimensional orthogonal coordinate system. To this end, the fundamental space vector and the at least one harmonic space vector are defined as a fundamental vector and as at least one harmonic vector in a respective two-dimensional orthogonal coordinate system. In other words, the coordinate system in which the fundamental vector is represented and the coordinate system in which the harmonic vector is represented are mutually dissociated in the first instance.

For the translation of the multiphase voltage signal into a two-dimensional vector, output voltages, for example, can firstly be translated by means of α-β transformation into a stationary and non-rotating coordinate or reference system, and thereafter by means of d-q transformation into a coordinate system which rotates at the frequency of the rotating field.

The fundamental space vector and the harmonic space vector are thus not regulated in dissociated coordinate systems in a mutually separate manner, but the coordinate systems are superimposed to form an overall coordinate system, in which the summed space vector or summed vector is represented as the sum of the fundamental space vector and the harmonic space vector. This summed space vector is then compared with the predefined threshold value. Only in the event that the summed space vector exceeds the predefined threshold value are the summed space vector, and thus the inverter output voltages, limited. In particular, the summed space vector is limited, wherein the at least harmonic space vector is controlled such that the limited summed space vector determined from the fundamental space vector and the controlled harmonic space vector lies below the threshold value.

By means of the method, output voltages, and thus torque, are only limited where this is necessary.

In a further development of the invention, a phase-dependent threshold value is predefined as the threshold value. In particular, the phase-dependent threshold value is defined by a hexagon in a two-dimensional coordinate system, which is formed by the superimposition of two-dimensional coordinate systems of the fundamental space vector and the harmonic space vector. This hexagon defines the maximum modulation of the electrical machine, i.e., the peak value of the normalized voltage signal.

The invention moreover includes a motor vehicle having a drive system according to the invention. The motor vehicle is configured as an electrically powered motor vehicle.

The embodiments proposed with reference to the method according to the invention, and the advantages thereof, apply correspondingly to the control device according to the invention, the drive system according to the invention and the motor vehicle according to the invention.

Further features of the invention proceed from the claims, the figures, and the description of the figures. Features and combinations of features indicated in the preceding description, and features or combinations of features indicated hereinafter in the description of the figures and/or represented in the figures alone, are not only applicable in the respectively indicated combination, but also in other combinations, or in isolation.

The invention is described in greater detail hereinafter with respect to a preferred exemplary embodiment, and with reference to the drawings. In the drawings:

DETAILED DESCRIPTION OF THE DRAWINGS

In the figures, identical or functionally equivalent elements are identified by the same reference symbols.

Figure 1:
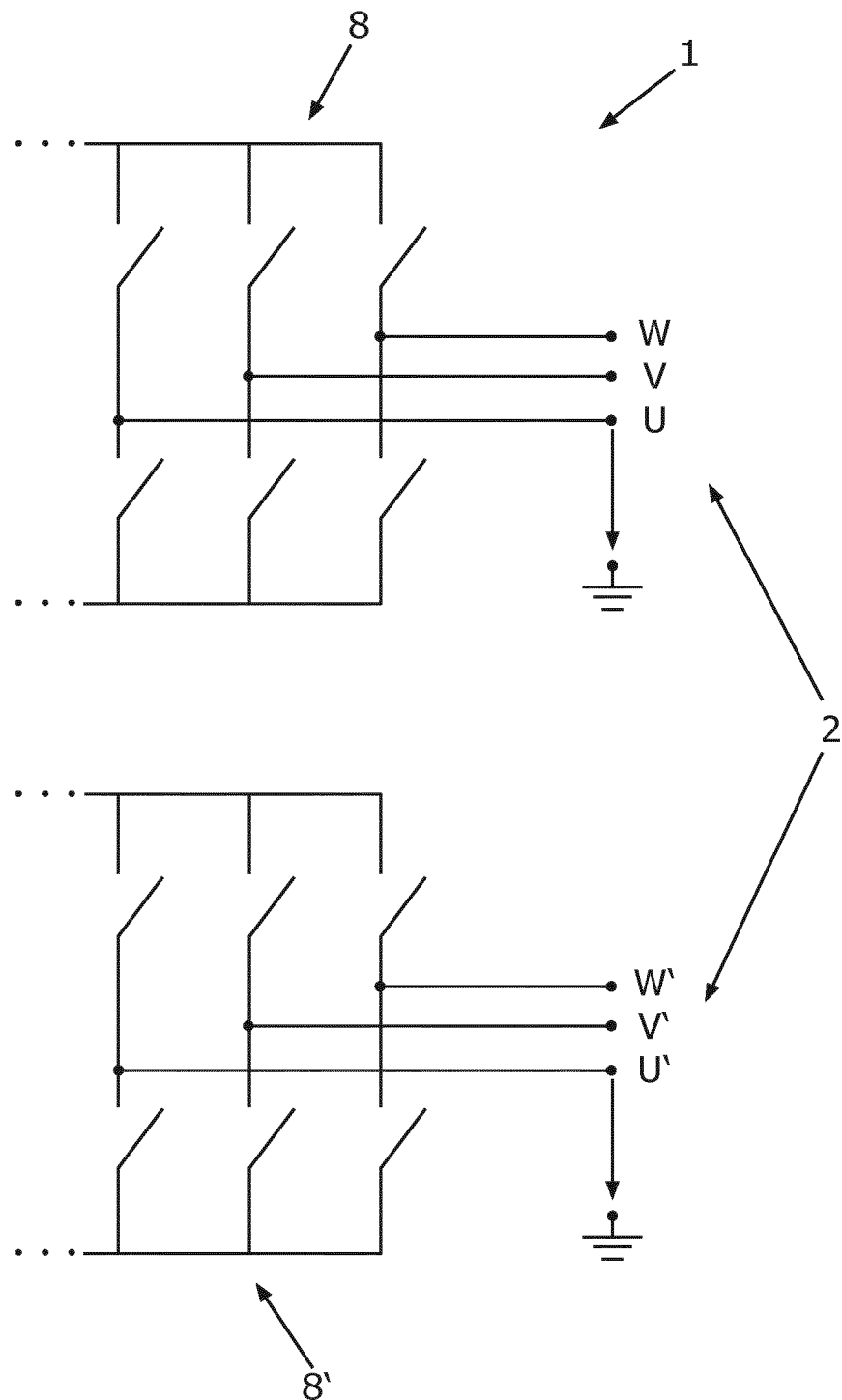
FIG. 1 shows a schematic representation of a drive system for a motor vehicle, having a six-phase machine.
Figure 2:
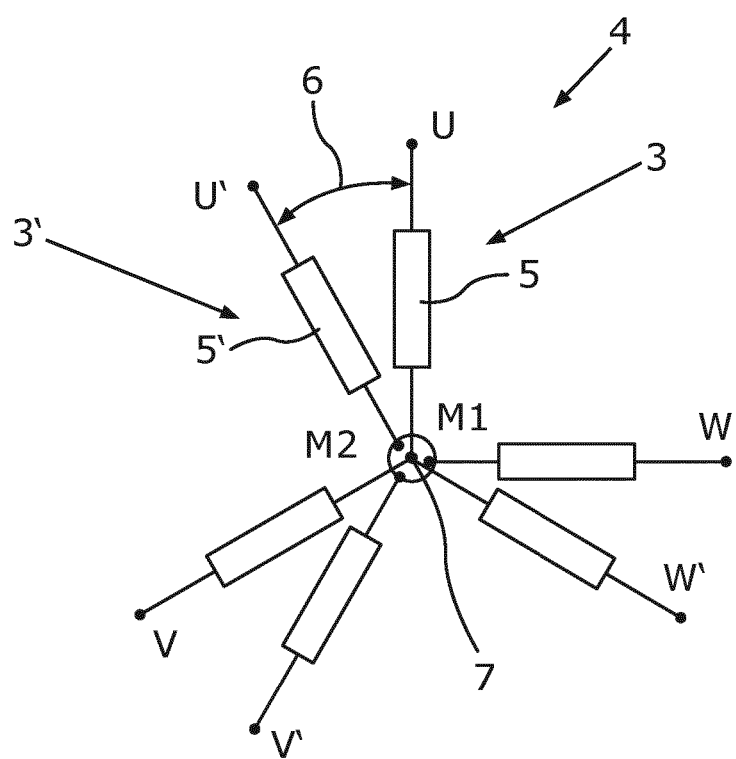
FIG. 2 shows a schematic representation of the phase sets of a six-phase electrical machine.

FIG. 1 shows a drive system 1 for a motor vehicle, having a six-phase electrical machine 2. In FIG. 2, two phase sets 3, 3' of a stator 4 of the electrical machine 2 are represented, each comprising three phases u, v, w, u', v', w', with respective stator windings 5, 5'. For each phase set 3, 3', three stator windings 5, 5' respectively are arranged with an angular offset of 120° about the circumference of the stator 4. The two phase sets 3, 3', in turn, assume an angular offset 6 which, in the present case, is 30'. The stator windings 5, 5' of each phase set 3, 3' are generally configured in a star-connected arrangement 7. This means that the three stator windings 5 of the first phase set 3 are interconnected at a first neutral point M1. The respective other ends of the stator windings 5 of the first phase set 3 are coupled to an inverter 8 and to a corresponding controller, for example, a PI controller, and are energized with the phase voltages U, V, W. In an analogous manner, the three stator windings 5' of the second phase set 3' are interconnected at a second neutral point M2, and the respective other ends are coupled to a further inverter 8' and to a corresponding controller, and are energized with the phase voltages U', V', W'. The two inverters 8, 8', in combination, supply a multiphase voltage signal for the stator windings 5, 5'. The inverters 8, 8' are connected, by means of an intermediate circuit which is not represented here, to an electrical energy store of the drive system 1, which is not represented here.

By the arrangement of the stator windings 5, 5' in corresponding, but offset phase sets 3, 3', a strong magnetic coupling is established between the stator windings 5, 5' within the electrical machine 2, thereby generating a high harmonic content in the phase currents of the electrical machine 2. In order to prevent any unnecessary shutdown of the inverters 8, 8' on the grounds of a high harmonic content, the multiphase voltage signals delivered by the inverters 8, 8' are limited.

Figure 3:
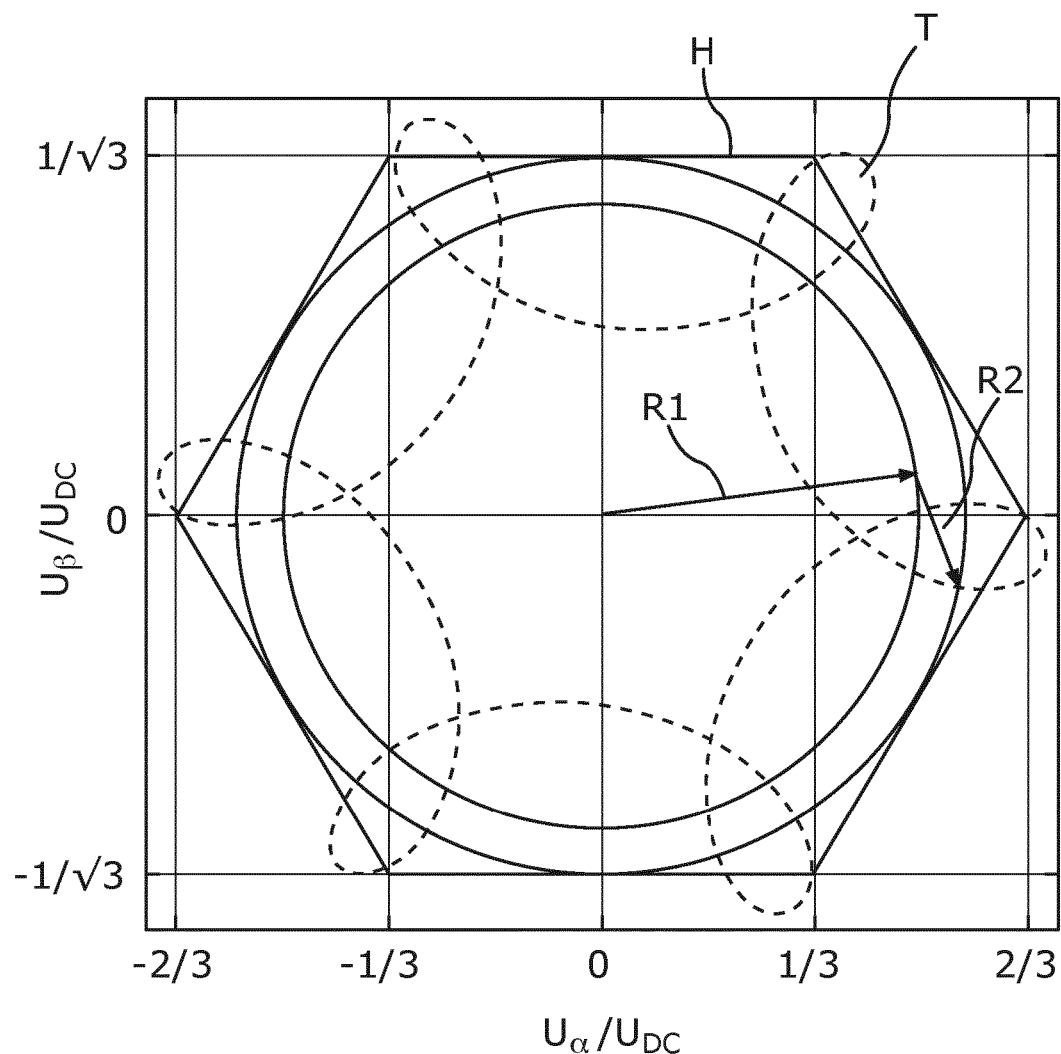
FIG. 3 shows a coordinate system, having two space vectors.

To this end, the multiphase voltage signals formed from the phase voltages U, V, W; U', V', W' are represented as space vectors in a two-dimensional α-β coordinate system, as shown in FIG. 3. In this case, the normalized voltage $U_\alpha/U_{DC}$ is plotted on the x-axis, and the normalized voltage $U_\beta/U_{DC}$ on the y-axis. Uric is the intermediate circuit voltage. A fundamental space vector R1, which represents the fundamental wave of the multiphase voltage signal, and a harmonic space vector R2 which, in particular, represents a fifth harmonic of the multiphase voltage signal, are determined. Although the fundamental space vector customarily moves along the internal circle of a hexagon H, it can also move along the hexagon H, for the short-term delivery of an increased torque.

For each phase angle, a summed space vector is formed by the addition of the space vectors R1, R2 associated with that phase angle. A peak of the summed space vector which rotates within the coordinate system moves along a trajectory T. For each phase angle, a check is executed as to whether the summed space vector lies within the hexagon H. In the case of phase angles at which the trajectory T of the summed space vector lies outside the hexagon H, in particular, the harmonic space vector is regulated for the limitation of the multiphase voltage signal such that, at its maximum, the summed space vector moves along the hexagon.

The invention claimed is:
1. A method for controlling a multiphase voltage signal which is supplied to at least one phase set of a stator of an electrical machine of a drive system of a motor vehicle, for the purpose of generating a torque-specific rotary magnetic field, the method comprising:
determining a fundamental space vector, representing a fundamental wave of the multiphase voltage signal;

determining at least one harmonic space vector, representing a harmonic wave of the multiphase voltage signal;

adding the fundamental space vector and the at least one harmonic space vector to form a summed space vector;

determining whether the summed space vector exceeds a threshold value; and limiting the summed space vector, such that a limited summed space vector falls below the threshold value.

2. The method according to claim 1, wherein the harmonic space vector is regulated such that the limited summed space vector determined from the fundamental space vector and the regulated harmonic space vector falls below the threshold value.

3. The method according to claim 1, wherein from phase-displaced phase voltages of the multiphase voltage signal, the fundamental space vector and the at least one harmonic space vector are determined as a fundamental vector and as at least one harmonic vector in a two-dimensional orthogonal coordinate system, respectively.

4. The method according to claim 1, wherein a phase-dependent threshold value is predefined as the threshold value.

5. A control device for a drive system of a motor vehicle, which is designed to execute a method according to claim 1.

6. The method according to claim 2, wherein from phase-displaced phase voltages of the multiphase voltage signal, the fundamental space vector and the at least one harmonic space vector are determined as a fundamental vector and as at least one harmonic vector in a two-dimensional orthogonal coordinate system, respectively.

7. The method according to claim 2, wherein a phase-dependent threshold value is predefined as the threshold value.

8. The method according to claim 3, wherein a phase-dependent threshold value is predefined as the threshold value.

9. The method according to claim 4, wherein the phase-dependent threshold value is defined by a hexagon, which represents a maximum modulation of the electrical machine, in a two-dimensional coordinate system which is formed by superimposition of two-dimensional coordinate systems of the fundamental space vector and the harmonic space vector.

10. A drive system for a motor vehicle, comprising:
at least one electrical machine having a stator and a rotor which is rotatably mounted with respect to the stator, wherein the stator includes at least one phase set having three phases;
at least one inverter for supplying the multiphase voltage signal to the phases of the at least one phase set; and
a control device according to claim 5.

11. The method according to claim 7, wherein the phase-dependent threshold value is defined by a hexagon, which represents a maximum modulation of the electrical machine, in a two-dimensional coordinate system which is formed by superimposition of two-dimensional coordinate systems of the fundamental space vector and the harmonic space vector.

12. The method according to claim 8, wherein the phase-dependent threshold value is defined by a hexagon, which represents a maximum modulation of the electrical machine, in a two-dimensional coordinate system which is formed by superimposition of two-dimensional coordinate systems of the fundamental space vector and the harmonic space vector.

13. The drive system according to claim 10, wherein the at least one electrical machine comprises at least two phase sets, each having three phases, wherein the phases of the at least two phase sets are mutually offset through an angle of 120° about an axis of rotation of the rotor, wherein the at least two phase sets are mutually offset through an angle of 30°, wherein each of the phase sets is configured in a star-connected arrangement, with a potential-free neutral point, and wherein the neutral points of the different phase sets are galvanically isolated from one another.

14. A motor vehicle having a drive system according to claim 10.

* * * * *